Patented Oct. 13, 1953

2,655,485

UNITED STATES PATENT OFFICE 2,655,485

SILOXANE STRUCTURAL FOAMS

Kenneth R. Hoffman, Midland, Mich., assignor to Dow Corning Corporation, Midland, Mich., a corporation of Michigan No Drawing. Application December 17, 1951, Serial No. 262,175

2 Claims. (Cl. 260—2.5)

This invention relates to siloxane structural foams.

Organic foamed products have found wide use in industry. These include both foamed rubbers and foamed resins. These foams, particularly the foamed resins, have found considerable structural applications in which they are used to reinforce structural members. They have also found use in floats for life saving equipment and for thermal insulation.

Heretofore, the only commercially suitable siloxane foams have been those relating to siloxane elastomers. These materials are prepared by foaming polysiloxanes having 1.9 to 2 organic radicals per silicon atom. A method of preparing them is described in U. S. Patent 2,460,795. This type of foam, however, is not suitable for use as in structural members because of its lack of rigidity. Resinous siloxane foams have been heretofore prepared by merely heating various resinous polysiloxanes. Whereas such a procedure will produce a foam, the resulting material is not of commercial utility because of its low strength and nonuniformity.

It is an object of this invention to prepare a commercially useful structural organopolysiloxane foam.

This invention relates to a siloxane foam having a density of less than 12 pounds per cu. ft. which density varies less than 2 per cent throughout the foam and having a compressive strength of at least 50 p. s. i. The siloxane is a copolymeric resin of the formula

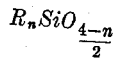

where R is a methyl or phenyl radical, at least 50 per cent of the R groups being methyl, and $n$ has a value from 1 to 1.5.

In order to produce foams within the scope of this invention, it is necessary to employ a limited range of organosiloxane resins. These resins are copolymers of methylsiloxane and phenylsiloxanes in which there are from 1 to 1.5 organic radicals per Si atom. Specific examples of such resins are copolymers of the following siloxane units: monophenylsiloxane, monomethylsiloxane, dimethylsiloxane, diphenylsiloxane and phenylmethylsiloxane. It is preferred that at least 50 per cent of the groups substituted on the silicon be methyl.

In order to prepare the foams of this invention, it is necessary to employ both a foaming agent and a catalyst for setting the siloxane resin. Foaming agents which are suitable include sodium bicarbonate, and sulphonyl hydrazides such as p,p'-oxy-bis-(benzene sulphonyl hydrazide). The amount of blowing agent should be between 1 and 6 per cent by weight based upon the siloxane resins.

The catalysts employed in this invention are preferably metal naphthenates such as iron, zinc and cobalt naphthenates. These are generally employed in amount of from .001 to 1 per cent metal based on the weight of the siloxane resin. Other siloxane polymerization catalysts may be employed provided they are relatively inactive at temperatures below 130° C. and become active at the frothing temperatures of the frothing agent. For the purposes of this invention it is preferred that the catalyst shall be active at temperatures of 140° C. to 200° C.

The resin to be used should be thermoplastic below 130° C. when in a solvent-free state, in order to facilitate uniform mixing of the resin with the frothing agent and catalyst. It is preferred that the solvent be completely removed prior to frothing because it interferes in the production of a uniform foam.

In the preferred procedure employed herein, the solvent-free resin is maintained at 130° C. while the frothing agent is added and uniformly dispersed. The catalyst may be added in this stage or it may have been previously added to the resin. The material is then heated at a temperature above the decomposition temperature of the frothing agent. It is preferred to employ a frothing agent which decomposes in the range from 140° C. to 160° C. In this case the resin would be heated at a temperature of about 200° C. After frothing has occurred, the foam may be further heated at the frothing temperature or above in order to improve its properties.

The method used to prepare the foams of this invention is adaptable either for the preparation of foam blocks, for example in an oven, or it may be employed for producing a foam "in place." For example, a mixture of the resin, frothing agent and catalyst may be poured into a structural member and the temperature thereafter raised to, say, 200° C. and maintained until the resin is cured.

The foams of this invention are noninflammable. They are not damaged by temperatures as high as 315° C. and they retain most of their structural strength at these high temperatures. The foams are of uniform structure as shown by the fact that the density varies relatively little throughout the foam. The material is nonbrittle.

These foams are useful as a low density reinforcing core in sandwich construction, as insulation in fire walls and as a buoyant float in life rafts and other life saving equipment.

The following examples are illustrative only and are not to be construed as limiting the invention which is properly set forth in the appended claims.

Example 1

4,638 grams of a siloxane resin composed of 28 mol per cent dimethylsiloxane, 34 mol per cent monomethylsiloxane, and 38 mol per cent monophenylsiloxane was heated at 145° C. until all the solvent was removed. The liquid resin was cooled to 130° C. and 30 grams of an iron naphthenate solution containing 6 per cent by weight iron was added and thoroughly stirred in. This represents 0.05 per cent by weight iron based on the weight of the resin. 61.5 grams of p,p'-oxy-bis-benzene sulphonyl hydrazide was then added and the mixture stirred until it was completely uniform. The mixture was poured into a stainless steel tray and heated at 200° C. After 15 minutes the temperature was increased to 250° C. for 1 hour and finally the mass was cured at 300° C. for 1 hour. The foam was allowed to cool slowly to room temperature. The resulting material had a density of 10.6 pounds per cu. ft. and a compressive strength at 30° C. of 59 pounds per sq. in. A sample of the foam was heated 24 hours at 300° C. and then allowed to cool at 30° C. Its compressive strength was 57 pounds per sq. in.

Example 2

Equivalent foams are produced when a siloxane resin having the composition 10 mol per cent diphenylsiloxane, 14 mol per cent phenylmethylsiloxane, 38 mol per cent monomethylsiloxane and 38 mol per cent monophenylsiloxane is treated as shown in Example 1.

That which is claimed is:

1. The method of preparing a siloxane structural foam comprising heating an essentially solvent-free polysiloxane resin to a temperature below 130° C. whereby to render the resin fluid, adding to the fluid resin a foaming agent and a catalyst for curing siloxane resins and thereafter heating the mixture to a temperature of at least 130° C. whereby the foaming agent decomposes producing a resin foam, and continuing to heat the foam so produced at a temperature above 130° C. until the resin is rendered insoluble and infusible, said siloxane resin being of the formula $$R_n SiO_{\frac{4-n}{2}}$$

where each R is selected from the group consisting of methyl and phenyl radicals, at least 50 per cent of said radicals being methyl and $n$ has an average value of 1 to 1.5.

2. A structural foam prepared by the method of claim 1.

KENNETH R. HOFFMAN.

References Cited in the file of this patent

UNITED STATES PATENTS

| Number | Name | Date |
|---|---|---|
| 2,460,795 | Warrick | Feb. 1, 1949 |
| 2,516,047 | De Costa | July 18, 1950 |
| 2,528,615 | Smith | Nov. 7, 1950 |
| 2,565,524 | Rust et al. | Aug. 28, 1951 |